United States Patent
Henderson

(10) Patent No.: US 6,599,038 B1
(45) Date of Patent: Jul. 29, 2003

(54) PASSIVE REMOTE LOOP-BACK METHOD AND APPARATUS FOR OPTICAL CIRCUIT VERIFICATION

(75) Inventor: Blaine Henderson, Winnipeg (CA)

(73) Assignee: Priority Electronics, Inc., Winnepeg (CA)

( * ) Notice: Subject to any disclaimer, the term of this patent is extended or adjusted under 35 U.S.C. 154(b) by 0 days.

(21) Appl. No.: 09/479,351

(22) Filed: Jan. 7, 2000

Related U.S. Application Data
(60) Provisional application No. 60/115,347, filed on Jan. 8, 1999.

(51) Int. Cl.$^7$ .......................... H04B 10/08; H04B 10/17
(52) U.S. Cl. ..................... 398/17; 398/22; 398/143; 398/144; 398/167; 398/178
(58) Field of Search ................. 359/110, 177, 359/161, 142, 143, 167, 179, 173

(56) References Cited

U.S. PATENT DOCUMENTS

| | | | | |
|---|---|---|---|---|
| 4,449,247 A | * | 5/1984 | Waschka, Jr. ................. 455/9 |
| 4,878,049 A | * | 10/1989 | Ochiai et al. ................ 714/708 |
| 5,687,014 A | * | 11/1997 | Czerwiec et al. ........... 359/123 |
| 6,097,515 A | * | 8/2000 | Pomp et al. ................ 359/117 |
| 6,359,713 B1 | * | 3/2002 | DeCusatis et al. .......... 359/179 |
| 6,411,407 B1 | * | 6/2002 | Maxham ..................... 359/110 |
| 6,452,965 B1 | * | 9/2002 | Suzuki ....................... 375/224 |

* cited by examiner

*Primary Examiner*—Leslie Pascal
(74) *Attorney, Agent, or Firm*—Pearne & Gordon LLP

(57) ABSTRACT

A passive remote loop-back method and apparatus for optical circuit verification is described. The apparatus may be remotely controlled through either of a dial-up or a data connection. The apparatus is adapted to: perform loop-back of received optical signals; verify status on loss of carrier; and, verify the status of its dual power supplies. The apparatus is also adapted to report alarm conditions by dialing a predetermined telephone number. The advantage is a versatile apparatus that may be monitored by a remote manager, and which automatically reports alarms using a dependable alternate communications medium.

16 Claims, 5 Drawing Sheets

PASSIVE REMOTE LOOP-BACK METHOD AND APPARATUS FOR OPTICAL CIRCUIT VERIFICATION

CROSS-REFERENCE TO RELATED APPLICATIONS

This application claims the benefit of priority under Title 35, USC § 120 to U.S. patent application Ser. No. 60/115,347 filed Jan. 8, 1999.

TECHNICAL FIELD

This invention relates to remote management and monitoring of fiber optic circuits and, in particular, to a method and apparatus for enabling remote monitoring of a fiber optic circuit that terminates on the apparatus.

BACKGROUND OF THE INVENTION

The use of fiber optics as a signal distribution medium is becoming increasingly popular. This is due to several factors. Fiber offers by far the greatest bandwidth of any transmission system. Since fiber is dielectric, it is not susceptible to radio or electromotive interference. Neither does it emit radio or electromotive interference. Although light signals suffer from attenuation, they are less prone to attenuate than electrical signals on a copper medium. Fiber is also intrinsically secure, because it is virtually impossible to place a physical tap without detection. Since no light is radiated outside a fiber optic's cable, physical taps are the only means of signal interception. For all these reasons, the use of fiber optic delivery systems is becoming ubiquitous.

Optical fibers are of two basic types, multi-mode and single mode. Multi-mode fiber is less expensive to produce, but has lower performance than single mode fiber because the inner core is larger in diameter. As the light rays travel down a Multi-node fiber, they disperse due to a phenomenon known as modal dispersion. Although reflected back into the inner core by the cladding on the fiber strands, different light rays travel different distances and therefore arrive at different times. As a length of the circuit increases and the speed of transmission increases, the pulses of light tend to interfere with each other in a phenomenon known as pulse dispersion. At that point, the light detector is unable to distinguish between the individual pulses. As a result, multi-mode fiber is generally used in applications involving relatively short distances and lower speeds, such as within customer premises.

Single mode fiber has a thinner inner core. It therefore performs better than multi-mode fiber over longer distances and at higher transmission rates. Although more expensive to manufacture, single mode fiber is used in long distance transmission links and particularly in high bandwidth applications.

Carriers typically use single mode fiber for fiber circuits to deliver services to customer premises. Customers typically use multi-mode fiber because it is less expensive and normally adequate for service delivery within the restricted environment of the customer premises. An interface is required at the customer demarcation point to convert from single mode to multi-mode signals. Such interfaces are well known in the art. A problem frequently experienced with such interfaces is that faults are difficult to isolate. When a communications fault is reported to a service provider, the service provider frequently has no choice but to dispatch a customer service representative to isolate the problem. There therefore exists a need for an apparatus adapted to terminate a fiber circuit that is capable of self-monitoring as well as being capable of entering a command mode that permits remote testing of the fiber circuit by providing a loop-back function to enable the fiber circuit to be monitored by sending a signal to the apparatus and checking to determine whether the same signal is received from the apparatus.

There is also a need for an apparatus that is secure, to ensure that unauthorized individuals cannot assume control or influence the operation of the fiber optic circuit.

SUMMARY OF THE INVENTION

It is therefore an object of the invention to provide an apparatus for enabling remote testing of a fiber optic circuit between a first end point and the apparatus.

It is a further object of the invention to provide an optical repeater that is adapted to enable testing of fiber optic circuits to which it is connected.

The invention therefore provides an apparatus that enables remote testing of a fiber optic circuit between a first end point and the apparatus, and a second fiber optic circuit between the apparatus and a second end point. The apparatus comprises a first transceiver for terminating the first fiber optic circuit between the first end point and the apparatus, and a second transceiver for terminating the second fiber optic circuit between the apparatus and the second end point. The apparatus also includes a high speed multiplexer that interconnects the first and second transceivers. A control unit of the apparatus controls the high speed multiplexer and automatically monitors other predetermined functions of the apparatus. The apparatus also includes at least one communications port for remotely communicating with the control unit to permit a remote administrator to perform remote testing of the fiber circuit and to monitor the other predetermined functions of the apparatus.

Typically, the first end point for the first fiber optic circuit is a service provider's equipment, and the second end point is a customer premise equipment, a local area network (LAN), for example. The first and second end points may also be repeaters in a fiber optic link.

The first and second fiber optic circuits may operate in different transmission modes. Typically, the first fiber optic circuit operates in a single mode and the second fiber optic circuit operates in a multi-mode. The apparatus in accordance with the invention is adapted to automatically convert from one mode to the other, and vice versa.

The apparatus in accordance with the invention is also adapted to control the high speed multiplexer on command, to loop-back signals received by either the first and second transceivers. This permits a remote administrator to test the integrity of a fiber optic circuit by commanding the transceiver to loop-back a signal sent from one of the first and second ends and monitoring receipt of the same signal. If the looped-back signal is received, the fiber optic circuit is determined to be operational without dispatching service personnel.

Command control of the apparatus is effected through at least one telecommunications port. Preferably, a telephone modem interface and a data interface are both provided. Access through each interface is strictly controlled by programmed procedures that only accept communications sessions from selected addresses. Any attempt to establish a communications session from any other address raises an alarm. Preferably, the alarm is automatically reported by the apparatus, which establishes a communications session with a predetermined address to report the alarm. The communications session is preferably established through the Public switched Telephone Network (PSTN) using the telephone modem interface.

The invention also provides a method of monitoring a remote apparatus for providing a connection between first and second fiber optic circuits, the remote apparatus converting optical signals received from either of the first and second fiber optic circuits into electrical signals and converting the electrical signals back into optical signals sent through an appropriate one of the first and second fiber optic circuits. The apparatus includes a control unit for monitoring functions of the apparatus. In accordance with the method, the apparatus automatically cyclically monitors predetermined functions of the apparatus to determine whether each of the predetermined functions are operating within a predetermined range. If the apparatus determines that any one of the functions is not operating within the predetermined range, the apparatus raises an alarm. The apparatus preferably determines whether the alarm is an alarm to be reported. It the alarm is an alarm to be reported, the apparatus automatically establishes a communications session with a predetermined alarm report address and automatically reports the alarm. In accordance with a preferred embodiment of the invention, every alarm is an alarm to be reported.

Preferably, the apparatus in accordance with the invention monitors at least: a) carrier on the first fiber optic circuit; b) carrier on the second fiber optic circuit; c) status of the main power supply; and d) status of the backup power supply. The apparatus may also monitor status of lasers used for sending optical signals through the first and second fiber optic circuits.

The invention also provides a method of securing a remote apparatus for providing a connection between first and second fiber optic circuits, the remote apparatus converting optical signals received from either of the first and second fiber optic circuits into electrical signals and converting the electrical signals back into optical signals sent through an appropriate one of the first and second fiber optic circuits. The apparatus includes a control unit for controlling and monitoring functions of the apparatus. The control unit is automatically operated to monitor communications ports of the apparatus for a communications connection request. On receipt of a communications connection request, the control unit automatically determines whether the communications request originated from a predetermined address. The communications request is rejected by the control unit if the communications request did not originate from the predetermined address. Preferably, an invalid communications request raises an alarm condition. If an alarm condition is raised, the control unit preferably automatically establishes a communications session with a predetermined report address to report the alarm.

The invention also provides a method of testing a fiber optic circuit using the apparatus in accordance with the invention. The fiber optic circuit is tested by establishing a communications session with the apparatus and instructing the control unit to loop-back optical signals on the fiber optic circuit to be tested. An optical signal is then sent from an end of the fiber optic circuit to be tested. On receipt of the signal, the apparatus loops the signal back on the same fiber optic circuit, and the remote administrator monitors the fiber optic circuit for return of the same signal. If the same signal is returned, the fiber optic circuit is determined to be in a functional condition.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
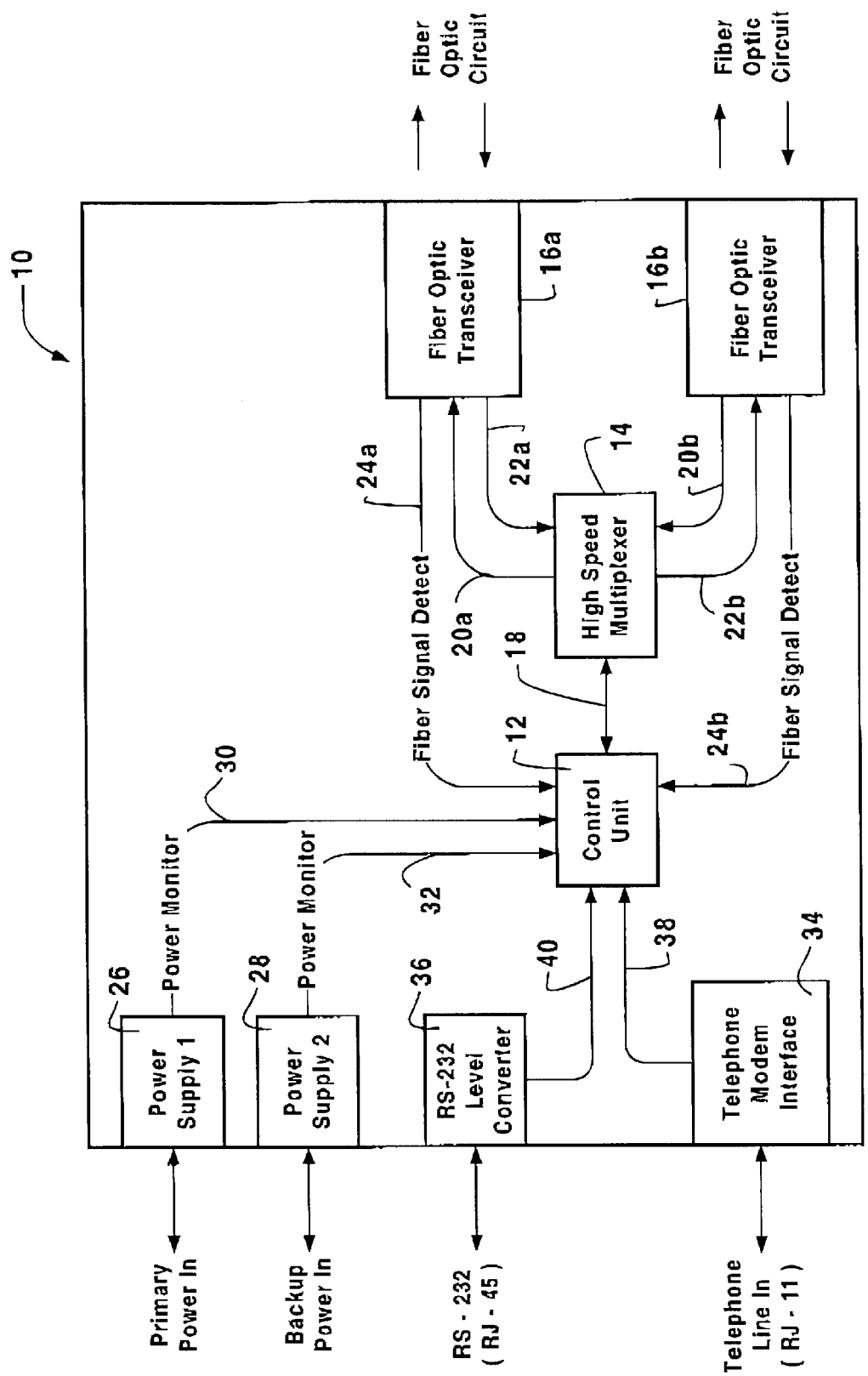
FIG. 1. is a schematic block diagram of an apparatus in accordance with the invention.

FIG. 1 is a block diagram that schematically illustrates a preferred embodiment of an apparatus 10 in accordance with the invention. The apparatus 10 may serve as a demarcation point between a service provider fiber optic circuit and a customer premise fiber optic circuit or as a repeater in a fiber optic link.

The apparatus 10 includes a microprocessor based control unit 12 that controls functionality of the apparatus 10, and automatically monitors certain functions of the apparatus, as will be explained below in more detail with reference to FIG. 5. The apparatus 10 also includes a high speed multiplexer 14 which may be, for example, a Positive Emitter Collector Logic (PECL) multiplexer, which is well known in the art. The high speed multiplexer 14 receives data input from the fiber optic transceiver 16a connected to a service provider fiber optic circuit via data input 22a. The high speed multiplexer 14 likewise receives data from a fiber optic transceiver 16b connected to a fiber optic circuit associated with a customer's premise, for example. Data from the fiber optic circuit 16b is passed through data input 20b to the high speed multiplexer 14. During normal communications, data arriving at fiber optic transceiver 16b is passed over the input 20b to the high speed multiplexer which may perform a mode conversion before passing the data over data output 20a to the fiber optic transceiver 16a which outputs optical signals over the associated fiber optic circuit. Likewise, optical signals received at fiber optic transceiver 16a are converted to electrical signals that are transferred to the high speed multiplexer 14 over input 22a and output by the high speed multiplexer 14 over output 22b to the fiber optic transceiver 16b, which converts the electrical signals to light signals output on the associated fiber optic circuit. A fiber signal detect circuits 24a, 24b enable the control unit 12 to monitor the carrier signal received by the respective fiber optic transceivers 16a, 16b.

When fiber optic circuit verification is required, the control unit 12 is enabled to control the high speed multiplexer 14 by sending commands over control channel 18 to cause the high speed multiplexer 14 to loop-back signals received by either one or both of the fiber optic transceivers 16a, 16b. This permits an administrator to send a signal over one of the fiber optic circuits associated with one or both of the fiber optic transceivers 16a, 16b, and monitor receipt of the same signal. If the same signal is returned, integrity of the fiber optic circuit is verified.

The apparatus 10 also includes redundant power supplies 26 and 28. The power supply 26 is connected to a primary source of power, such as a direct current (DC) input. The power supply 28 is connected to a backup power supply that provides operating power if the primary power supply 26 fails, or power is interrupted. Power monitor connections 30, 32 permit the control unit 12 to monitor the status of the respective power supplies 26, 28.

The apparatus 10 also includes at least one communications port to permit a remote administrator to control the apparatus 10 for the purpose of testing either one of the fiber optic circuits 16a, 16b. The telephone modem interface 34 is a standard dial-up interface well known in the art. A connector 38 enables communications between the control input 12 and the telephone modem interface 34. The apparatus 10 is likewise preferably equipped with a data communications port 36, such as an RS-232 level converter, which enables communication via a data network such as a Wide Area Network (WAN), for example. A communications connection 40 permits the control unit 12 to exchange data with the data port 36.

Figure 2:
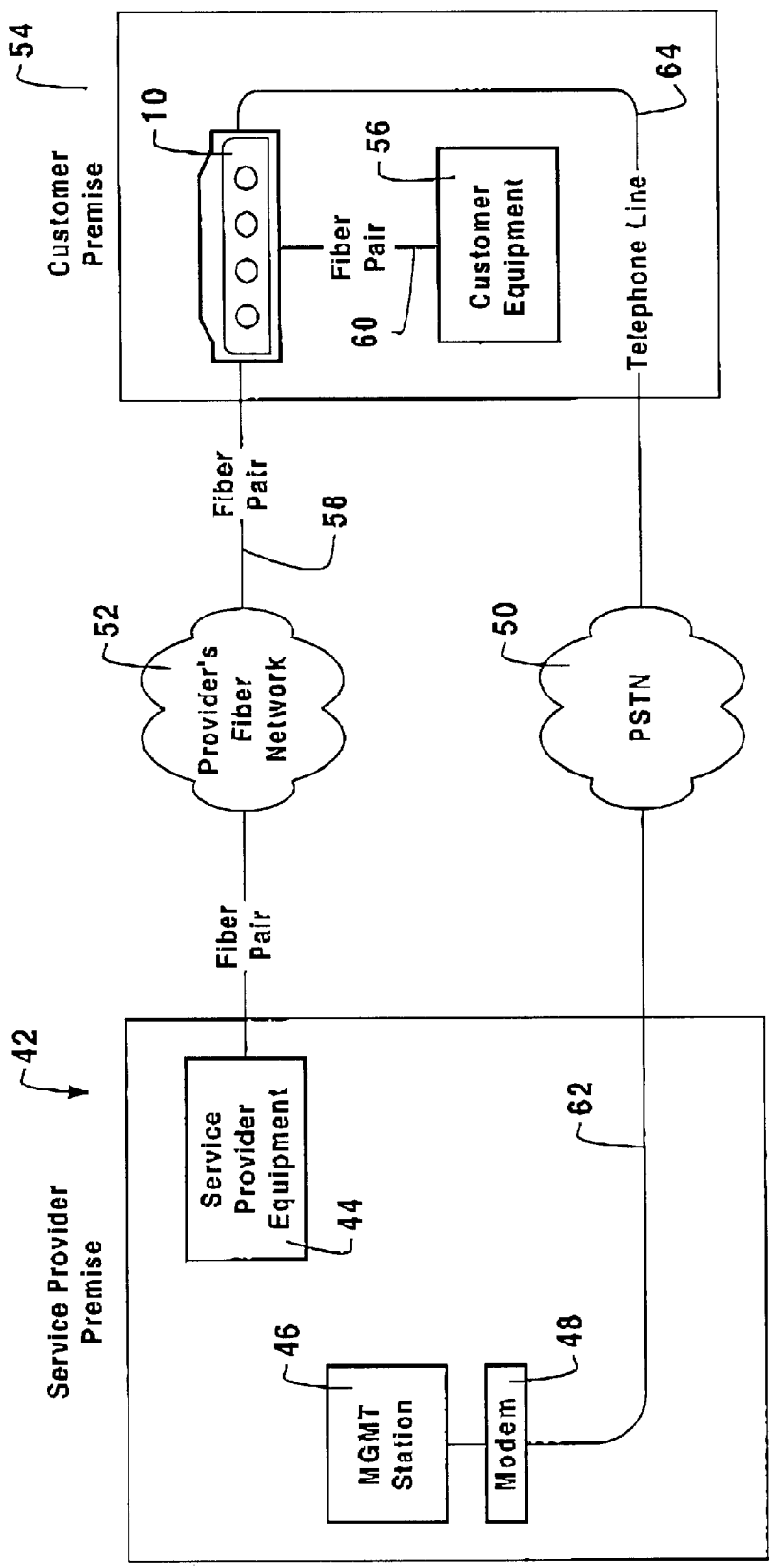
FIG. 2 is a schematic diagram of networks used in establishing a dial-up communications session with the apparatus shown in FIG. 1.

FIG. 2 is a schematic diagram of the apparatus 10 in a typical environment in which the apparatus is installed at a demarcation point between a provider's fiber network and customer equipment. As shown in FIG. 2, a service provider premise 42 includes service provider equipment 44 and management workstation 46. As will be understood by those skilled in the art, service provider premises are considerably more complex and the schematic illustration shown in FIG. 2 only illustrates those components related to the invention. The management workstation 46 is connected to a modem 48 in a manner well known in the art. The modem 48 can be used in a dial-up connection to access the apparatus 10 for testing and diagnostic purposes, as will be explained below with reference to FIGS. 4 and 5. Access is accomplished through the PSTN 50 in a manner well understood in the art. The modem 48 is connected to the PSTN 50 by a local loop 62, for example, and the telephone modem interface 34 (FIG. 1) is connected to the PSTN by a local loop 64. The service provider's equipment 44 is connected to the service provider's fiber network 52 and to the apparatus 10 by a first fiber optic circuit 58. The customer equipment 56 is connected to the apparatus 10 by a second fiber optic circuit 60. The management workstation 46 is able to access the apparatus 10 by dialing a telephone number associated with the apparatus 10 in a manner well known in the art.

Figure 3:
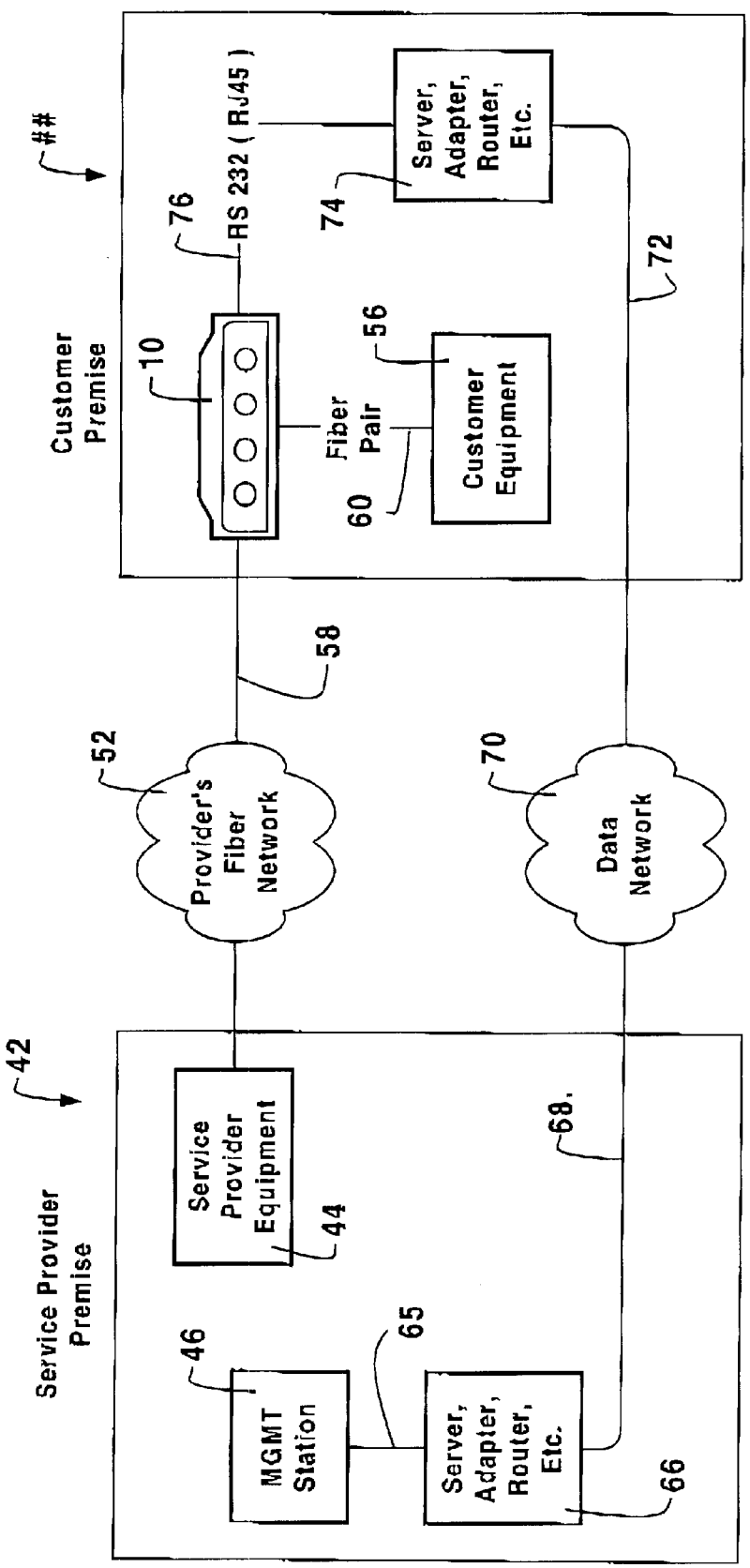
FIG. 3 is a schematic diagram of the networks used in establishing a communications session through a data network with the apparatus shown in FIG. 1.

FIG. 3 is a schematic illustration of communications connections used to access the apparatus 10 from a management workstation 46 through a data network 70. The management workstation 46 is connected by a data connection 65 (a Local Area Network, for example) to a server, adapter or router 66, for example. The server 66 is connected by a data link 68 to a data network 70. A customer server, adapter or router 74 is connected to the data network 70 by a data link 72. The apparatus 10 is connected to the server, adapter or router 74 by a data connection 76, a LAN for example. The management station 46 is adapted to access the apparatus 10 by establishing a data connection using any one of a number of protocols well known in the art.

Figure 4:
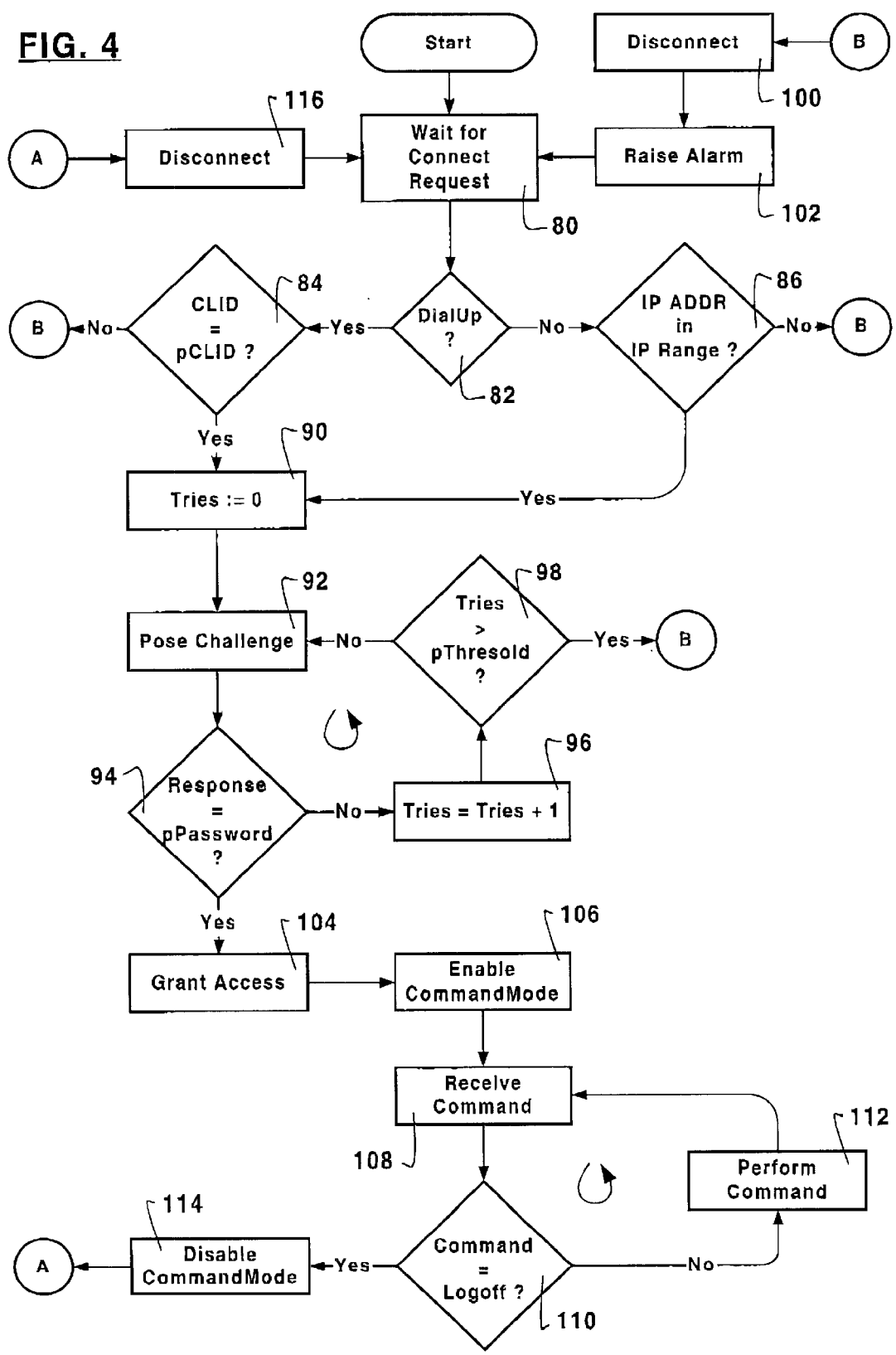
FIG. 4 is a flow diagram illustrating the control logic used for controlling access to the apparatus shown in FIG. 1.

FIG. 4 is a flow diagram illustrating a process in which the management workstation 46 accesses apparatus 10 and enters a command mode used, for example, to test the fiber optic circuit 58 (FIGS. 2, 3). In step 80, the apparatus 10 waits for a connect request by listening to each of the communications ports 34, 36 (FIG. 1). On receipt of a connect request, the apparatus 10 determines whether the request originates from communications port 34 or 36 in step 82. If the request is a dial-up request, the apparatus 10 preferably extracts a Calling Line Identification (CLID) from the connect request and compares it with a stored CLID (pCLID) to determine whether the connect request is authorized. If it is determined in step 82 that the request is not a dial-up request, in step 86 the control unit 12 compares an address of the connection request (IP address, for example) with, for example, a range of acceptable addresses to determine whether the request originates from an authorized location (step 86).

If the communications request is determined to have originated from an authorized location in either of steps 84 or 86, a variable (Tries) is set to "0" in step 90 and the administrator is requested to enter a password in step 92. In step 94, the password is compared with a stored password associated with the CLID or the IP address to determine whether the administrator has rights to access the apparatus 10. If passwords do not match, the variable initiated in step 90 is incremented in step 96 and compared with a threshold (pTHRESHOLD) in step 98. If the threshold is not exceeded, the control unit 12 again requests the password in step 92. If the threshold is exceeded, the connect request is discarded and the communications port is disconnected in step 100, an alarm is raised in step 102, and the control unit 12 returns to the waiting state in step 80.

If the password is accepted in step 94, access is granted in step 104 and command mode is enabled in step 106. In command mode, the control unit 12 waits for commands sent by the management station 46 (FIG. 2, 3) and responds to those commands. On receipt of a command in step 108, the control unit 12 examines the command in step 110 to determine whether the command equals logoff. If not, the control unit 12 performs the command in step 112 and returns to the waiting state for a next command. If the command is a logoff command, the control unit 12 disables command mode in step 114, disconnects in step 116 and returns to the wait state for a connect request.

Figure 5:
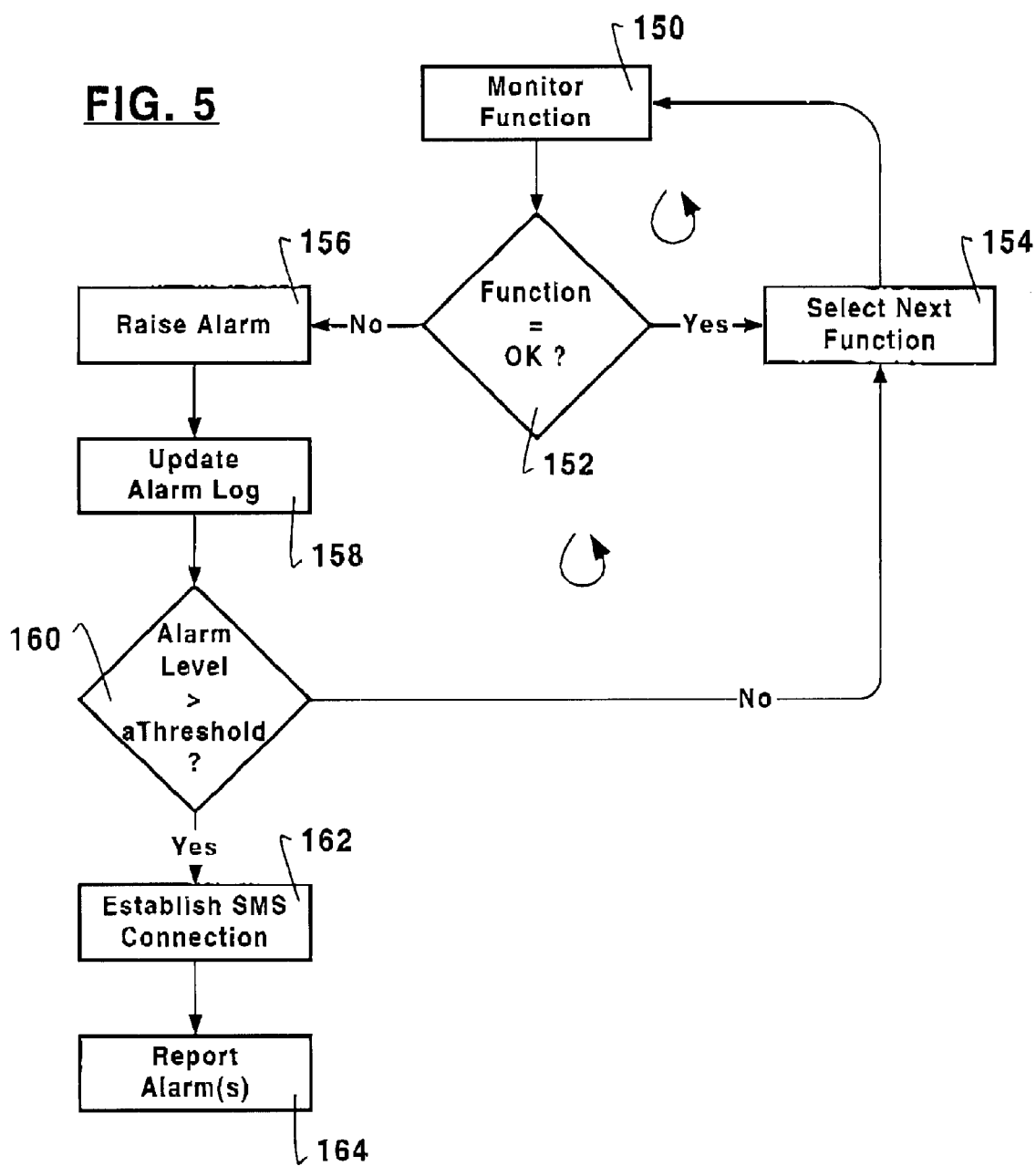
FIG. 5 is a flow diagram illustrating the logic used in monitoring predetermined functions of the apparatus shown in FIG. 1 and reporting alarm conditions.

FIG. 5 is a flow diagram that illustrates the logic of a preferred monitoring function performed by the control unit 12 when the control unit 12 is not in command mode. Preferably, the control unit 12 automatically and cyclically monitors certain predetermined functions of the apparatus 10 when it is not operating in command mode. Those functions include, for example, the status of the carrier signals on the fiber optic transceivers 16a, 16b (FIG. 1), the status of the power supply 26 and the power supply 28, as well as the status of the communications ports 34 and 36. Other functions including the status of output lasers (not shown) of the fiber optic transceivers 16a, 16b may likewise be monitored.

In a preferred automatic process, the control unit 12 monitors a function in step 150, using methods well known in the art, and determines in step 152 whether the function is operating within a predetermined range. If the function is operating within the predetermined range, a next function is selected in step 154 and that function is monitored in step 150. If the function is not operating within the predetermined range, an alarm is raised in step 156. Preferably, an alarm log is updated in step 158 and the level of the alarm is compared with an alarm threshold in step 160. If the alarm level does not exceed the threshold, the process returns to select a next function to be monitored in step 154. If the alarm level exceeds the threshold, the control unit 12 is preferably programmed to establish a connection with system management in step 162 using one of the communications ports 34, 36. For example, the control unit 12 may be programmed to dial a specified number using the telephone modem interface 34 in order to report alarms. After the communication session is established, the control unit 12 reports the alarm in step 164. After reporting the alarm, the control unit may return to monitoring functions, or may enter a shutdown state, depending on the severity of the alarm and the nature of the malfunction.

It is therefore apparent that the apparatus 10 in accordance with the invention a useful tool which may be used as an interface between a service provider and a customer network, or as a repeater in a fiber optic link. Although the examples described above relate exclusively to the use of the apparatus 10 as an interface between two networks, it will be apparent to those skilled in the art that the apparatus may also be used as a repeater in a fiber optic link. As such, the apparatus 10 permits either portion of the link to be monitored for link integrity and any hardware problems associated with the apparatus 10 are automatically reported, as described above.

The embodiments of the invention described above are intended to be exemplary only. The scope of the invention is therefore intended to be limited solely by the scope of the appended claims.

I claim:

1. Apparatus to enable remote testing of a first fiber optic circuit between a first end point and the apparatus, and a second fiber optic circuit between the apparatus and a second end point, comprising:
   a) a first transceiver for terminating the first fiber optic circuit between the first end point and the apparatus;
   b) a second transceiver for terminating the second fiber optic circuit between the apparatus and the second end point;
   c) a high speed multiplexer interconnecting the first and second transceivers;
   d) a control unit for controlling the high speed multiplexer and monitoring other predetermined functions of the apparatus; and
   e) at least one communications port for remotely communicating with the control unit to permit a remote administrator to perform remote testing of the fiber circuit and monitoring of the other predetermined functions of the apparatus.

2. Apparatus as claimed in claim 1 wherein the first end point is a service provider's equipment, and the second end point is a customer's premise equipment.

3. Apparatus as claimed in claim 1 wherein the first end point is one of a service provider's equipment and a repeater in a fiber optic link, and the second end point is one of a customer premises equipment and another repeater in the fiber optic link.

4. Apparatus as claimed in claim 1 wherein the apparatus functions as a repeater in a fiber optic link.

5. Apparatus as claimed in claim 4 wherein the repeater performs a mode conversion between the first and second fiber optic circuits.

6. Apparatus as claimed in claim 5 wherein the first fiber optic circuit operates in single mode and the second fiber optic circuit operates in multi-mode and a conversion from single mode to multi-mode is performed by the apparatus.

7. Apparatus as claimed in claim 5 wherein the first fiber optic circuit operates in multi-mode and the second fiber optic circuit operates in single mode and a conversion from multi-mode to single mode is performed by the apparatus.

8. The apparatus as claimed in claim 1 wherein the apparatus is adapted to control the high speed multiplexer on command, to loop back signals received by either one or both of the first and second transceivers.

9. Apparatus as claimed in claim 1 wherein the apparatus further includes a primary power supply and a backup power supply, and the control unit is adapted to determine a status of each of the primary and the backup power supplies.

10. Apparatus as claimed in claim 1 wherein the at least one communications port includes a dial-up port and a data port to permit remote control of the apparatus using either of a dial-up connection through the Public Switched Telephone Network (PSTN) and a data connection through a data network.

11. Apparatus as claimed in claim 1 wherein the control unit is enabled to raise an alarm whenever any one of the predetermined functions monitored by the apparatus is determined to be operating outside a predetermined range.

12. Apparatus as claimed in claim 11 wherein on raising an alarm, the apparatus is adapted to establish a communications connection using the at least one communications port in order to report the alarm to alert an administrator of the alarm.

13. Apparatus as claimed in claim 12 wherein the communications connection is a dial-up connection through the PSTN.

14. Apparatus as claimed in claim 12 wherein the communications connection is a data connection established through a data port.

15. Apparatus as claimed in claim 1 wherein the first fiber optic circuit is a single mode fiber circuit, and the second fiber optic circuit is a multi-mode fiber circuit.

16. Apparatus as claimed in claim 1 where in the at least one communications port is a dial-up modem port and the dial-up modem part will only accept calls originated from a predetermined calling line.

* * * * *